Patented Aug. 5, 1947

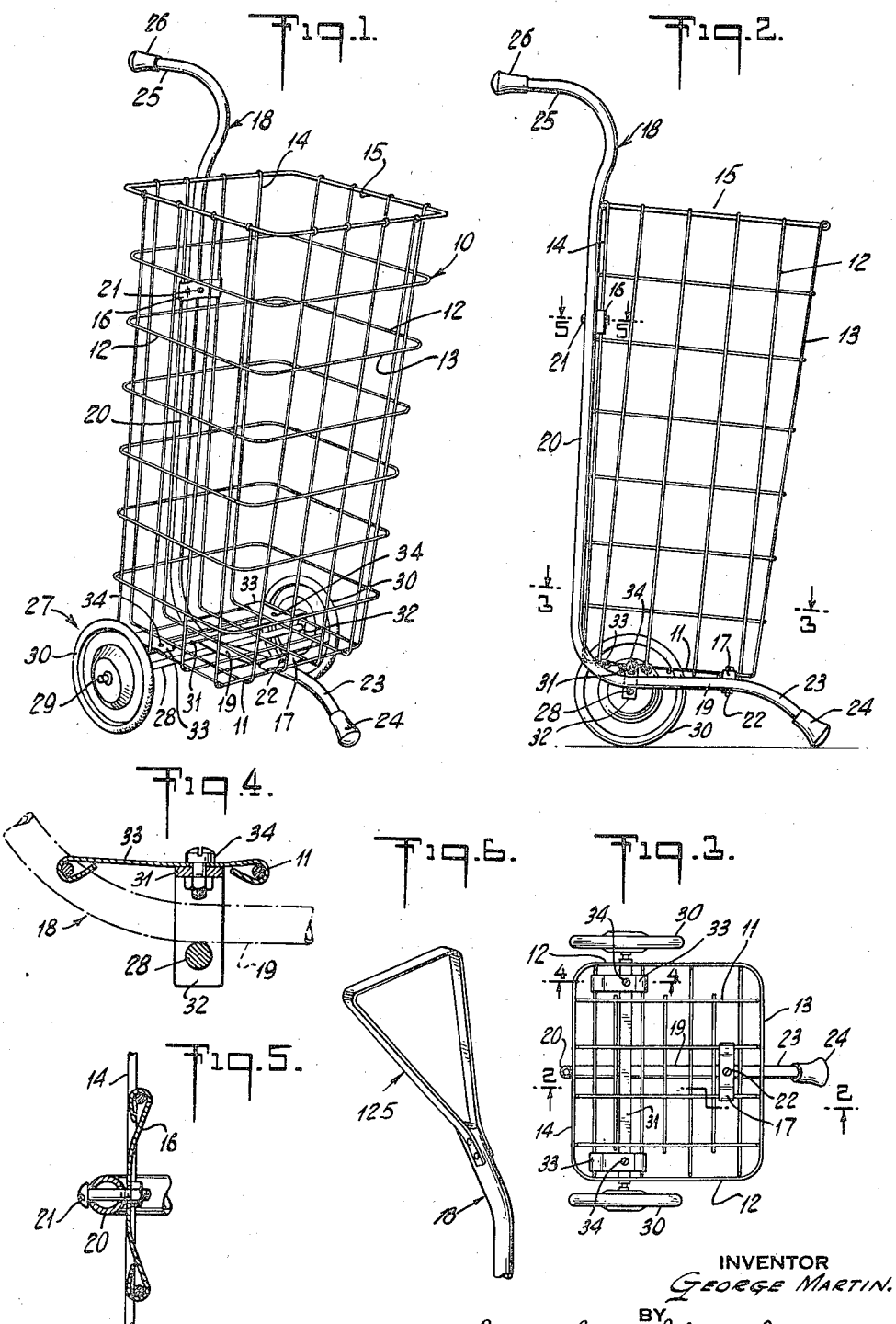

2,425,107

UNITED STATES PATENT OFFICE 2,425,107

WHEELED MOBILE CONTAINER APPARATUS

George Martin, New Hyde Park, N. Y.

Application May 13, 1947, Serial No. 747,618

2 Claims. (Cl. 280—51)

The present invention relates to a wheeled mobile container apparatus which, in a preferred embodiment, constitutes a wheeled shopping basket, although, if desired, it may be employed for analogous uses; and the present application constitutes a continuation-in-part of my copending application Serial No. 740,020, filed April 8, 1947, now abandoned.

A general object of the present invention is to provide such a wheeled mobile container apparatus which is desirably rigid and of simple and sturdy construction readily adapted to economical commercial production; may, if desired, be built and distributed in the form of a few easily assembled sub-assemblies to simplify packing and shipping while permitting ready erection and fitting of the sub-assemblies together with a minimum of skill; and which, while being of extremely simple construction, permits easy wheel transport for packages and merchandise and self support upon the surface over which it is being wheeled without danger of spilling the basket contents.

A more specific object of the present invention is to provide such a wheeled mobile container apparatus characterized by three main sub-assemblies, viz., a non-collapsible container or basket; an elongated rod-like control and operating member which constitutes means for supporting the basket and a handle therefor and to serve at its lower end as bracing means which, when rested against the ground, will assure that the apparatus will stand with stability so that the basket will remain upright to avoid spilling the basket contents; and two-wheeled carriage means for support of the basket and the control and rest member therefor, both while being wheeled and when stood upright.

Another object of the present invention is to provide such a two-wheeled shopping basket which has an open-top, non-collapsible container, preferably of wire mesh, fastened to (preferably in a removable manner) and supported upon an elongated rod-like unitary control and operating member reinforcing the basket and providing therefor an operating handle and a pair of rest means with one adapted by engagement of the ground efficiently and stably to support, with the carriage wheels, the basket in a substantially upright position, the other rest means being adapted, when rested against upright structure, also to support with the wheels the basket either in a similar position or, when swung down to be rested against the ground, in a basket-tilted position while assuring substantial retention of basket contents.

A further object of the present invention is to provide a structural embodiment of the device which is readily constructed and allows efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is an elevational perspective of a preferred embodiment of the present invention when rested in a substantially upright position;

Fig. 2 is an elevational section of the structure shown in Fig. 1, taken substantially on line 2—2 of Fig. 3;

Fig. 3 is a transverse section, taken substantially on line 3—3 of Fig. 2 and looking down upon the carriage means thereof;

Fig. 4 is a detailed sectional view through clamp means employed to mount the carriage means to the basket and taken substantially on line 4—4 of Fig. 3, showing therein relative position of parts with respect to a portion of the frame member 18 shown in dot-dash lines;

Fig. 5 is a detailed sectional view through other clamp means employed removably to fasten the basket to the frame member 18 and taken substantially on line 5—5 of Fig. 2; and Fig. 6 is a perspective view of a modified form of the handle portion of the frame member 18 shown in Figs. 1 and 2.

Referring to the drawing, like numerals indicate similar parts throughout and, as will be seen therefrom, a preferred embodiment of the present invention comprises an open-top, non-collapsible container 10, preferably formed of wire mesh or interwoven wires which may be welded together at their junctures, and having substantially rectangular bottom 11, sides 12, 12, front 13 and back 14 panels. In the preferred embodiment, the container 10 is relatively deep, and has its top 15 open. The container 10 constitutes a sub-assembly unit and for the purposes of assuring proper positioning of parts and to avoid loss or misplacement of clamping means to fasten sub-assemblies together, it has fitted thereto clamping plates 16 and 17, or a greater number thereof if desired.

The clamping plates 16 and 17 may, if desired, be of similar construction with each bridging across between two adjacent, longitudinally extending wires and with the ends of each plate curled about the wires which, if those wires are arranged substantially parallel to each other as preferred and shown, may permit some limited relative sliding movement of each of the plates. The clamping plate 16 is preferably so mounted upon a pair of the substantially vertically extending, adjacent parallel wires in the back panel 14, preferably near the top of the latter, as shown. The clamping plate 17 is preferably so mounted on a pair of the adjacent, substantially parallel wires extending forwardly in the bottom panel 11 of the basket, and preferably near the front of the latter. Of course, as has been done in some embodiments of the invention, the clamping plates 16 and 17 may have their ends welded to their supporting wires, rather than curled therearound for sliding movement. It will be noted from the drawing that the clamping plates 16 and 17 are mounted respectively on the back 14 and bottom 11 panels of the basket 10 substantially intermediate of the two sides panels 12, 12 so that the basket may be substantially medially supported by those clamping means. As indicated each of the clamping plates 16 and 17 has a bolt hole formed therethrough substantially intermediate of its ends.

Another sub-assembly of the preferred embodiment of the present invention consists of a substantially rigid elongated, rod-like unitary member 18, which may be formed of any suitable metallic material and preferably is made of bent steel tubing. The substantially rigid member 18 has a forwardly extending support portion 19 which, when the apparatus is in the upright position shown in Fig. 1, is arranged substantially horizontal. Member 18 also includes a substantially upright portion 20 extending upwardly from the rear of the support portion 19 and, in the preferred form, may be arranged substantially at right angles thereto so that the support portion 19 will extend beneath the bottom panel 11 of the basket 10 and the substantially upright portion 20 will lie along the back of the back panel 14. Preferably, a bolt 21 is located through the hole in the clamp plate 16 and a hole in the substantially upright portion 20 of the member 18 and a nut thereon removably secures the parts together. It is also preferred to position a similar bolt 22 through the hole in clamp plate 17 and a hole in support portion 19 of the member 18, and to thread a nut thereon also removably to secure those parts together.

The elongated, rod-like member 18 also includes a forward terminal supporting portion 23 in front of the support portion 19 and extending downwardly with respect to the latter, as shown. The lower end of the supporting portion 23 is adapted for engagement of ground surface to serve as a rest with the basket in an upright position and, accordingly, is preferably equipped with a rubber tip 24. The member 18 additionally has a handle portion 25 extending rearwardly from the upper part of the substantially upright portion 20.

In the embodiment shown in Figs. 1 to 5 inclusive, those substantially upright and handle portions 20 and 25 may be merged together in a curve, as shown, with the rear end of the handle portion extending back beyond the back panel 14 of the basket 10 a substantial distance to provide for convenient grasping, and also to form a second rest for basket support when engaged either against a substantially vertical structure, such as a wall, tree or the like, with the basket substantially upright, or against a lower structure or ground surface, with tilt of the basket to a rested oblique position. For this purpose, the rear end of the handle portion 25 preferably is equipped with another rubber tip 26. The rubber tips 24 and 26, when their respective rest brackets 23 and 25 cooperate with the wheeled carriage means of the apparatus, assure effective frictional engagement of the surfaces of the ground or upright structures against which the apparatus may be leaned, to prevent coasting, which might result in upsetting of the basket and spilling of the contents thereof.

The third sub-assembly of the preferred embodiment of the apparatus comprises carriage means 27, which includes in the preferred form, a cross axle 28 having rotatably mounted on the ends 29, 29 thereof a pair of wheels 30, 30. The carriage means 27 also includes a bolster plate 31 having the ends thereof 32, 32 turned downwardly substantially at right angles thereto to provide a pair of ears, with each apertured, as shown, to receive therethrough the axle 28. The carriage means sub-assembly 27 thus includes a pair of wheels 30, 30 rotatably supported about an axle 28 on which is mounted a bolster plate 31.

The bottom panel 11 of the basket 10 also carries a pair of clamping plates 33, 33 having their ends curled about a pair of adjacent, substantially parallel, transversely extending wires in the bottom panel, preferably to the rear of a transversely extending medial line thereof so as to be mounted behind or to the rear of the center of gravity of the super-structure of the apparatus consisting of the basket 10 and the elongated control and rest member 18. The clamping plates 33, 33 may, as shown, be constructed similarly to the brackets 16 and 17 and, accordingly, each has a hole therethrough which receives a bolt 34 extending through a hole in the bolster plate 31, and a nut on each bolt removably fastens the parts together.

For convenience in packing and shipping, the embodiment of the present invention described above is, as suggested, supplied to the trade in the form of three separate sub-assemblies, basket 10 with its clamping means, the elongated control and rest member 18, and the two-wheeled carriage means 27. The purchaser can readily assemble the parts of the apparatus together after removing the nuts from the bolts 21, 22 and 34, 34. The bolt 21 will then be placed in the hole in the substantially upright portion 20 of the member 18 and its nut can be temporarily and loosely engaged thereon. The carriage means 27 may then be loosely applied by projecting the rest bracket 23 and the support portion 19 of the member 18 through between the bolster plate 31 and the cross axle 28 with the former positioned beyond bolt 22 in the clamp plate 17, and with the wheels 30, 30 located outwardly of the basket side panels 12, 12. Bolt 22 may then be put in the hole in the support portion 19 of member 18 and its nut threaded thereon with slight adjustment, if needed, of the plates 16 and 17 along their respective supporting wires. Tightening of the nuts on bolts 21 and 22 will securely fasten in a rigid manner the basket 10 upon the elongated member 18 with the bolster plate 31 loosely located between the bottom basket panel 11 and the support portion 19 of the elongated member. The substantially rigid member 18 gives desired rigidity to the basket 10.

In the preferred form, as shown, the support portion 19 and the substantially upright portion 20 of the member 18 may be merged together in a downwardly extending curve, preferably to provide sufficient intervening space between the basket bottom panel 11 and member 18 for free adjustment of the bolster plate 31, and also to provide, when the parts of the apparatus are fully assembled, to cause that downwardly curved portion of member 18 to bear against the cross axle 28 so as to prevent rotational wear thereof in the holes in axle-supporting ears 32, 32 of the bolster plate. As a final assembly operation bolts 34, 34 will be positioned in the bolt holes in the bolster plate 31 with slight adjustment, if needed, of the clamping plates 33, 33 along their supporting wires for alignment of the holes. Nuts are then replaced on bolts 34, 34 and tightened up so as to pull the bolster plate 31 up into rigid position against the basket bottom panel 11 and also simultaneously to cause the downwardly curved portion of the member 18 to cramp or bear down against cross axle 28 to prevent the remarked rotation of the latter, as suggested in Fig. 4. The bolster plate 31 cooperates with support portion 19 of member 18 in giving desired rigidity to the bottom of basket 10. The resulting assembled wheeled mobile container apparatus is ready for use.

In operation or employment of the assembled wheeled mobile container apparatus or shopping basket, shown in Figs. 1 to 5 incl., a housewife will place the structure on the ground or floor with the wheels in engagement thereof and the basket in a substantially upright position. It may then be wheeled around at will, either pushing or dragging it by the handle portion 25 and with the basket slightly tilted to free the rest bracket 23 from engagement of its tip 24 with the ground surface. If it is desired to rest the basket in a self-supporting position, the structure may be tilted slightly forward until the rubber tip 24 of the rest bracket 23 is brought into engagement with the ground which will then cooperate with the wheels 30, 30 to support the basket in a suitable manner in a substantially upright position, as shown in Figs. 1 and 2. The user may also lean the apparatus against an upright structure, such as a wall, by engaging the rubber tip 26 on the rear end of the handle portion 25 thereagainst with the basket in a substantially upright position, or the basket may be rested in a tilted position with the tipped end of the handle portion resting against a lower structure or even a ground surface. In the latter case the three point support provided by the two wheels and the handle portion is such that the basket will be in an oblique position, though tilted, so that there will be a minimum of tendency for the basket contents to spill out.

As an alternative, there may be substituted for the handle portion 25 and its rubber tip 26 a different type of handle such as a loop 125, as shown in Fig. 6.

It will thus be seen that the objects set forth above and those made apparent from the preceding description are efficiently attained and, since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A wheeled mobile container apparatus comprising, in combination; a substantially rigid, elongated, rod-like, unitary member bent to provide a forwardly extending support portion, a forward terminal supporting portion in front of the support portion extending downwardly with respect to the latter and terminating at a lower end, a substantially upright portion extending upwardly from the rear of the support portion, and a handle portion extending rearwardly from the upper part of the substantially upright portion and terminating in a rear end; a pair of rubber tips with one mounted on the lower end of said supporting portion and the other mounted on the rear end of said handle portion, each adapted for supporting surface engagement; an open-top wire mesh container having a back panel and a bottom panel and medially supported on said member to constitute therewith a super-structure; clamp means removably fastening the back panel of said container to the substantially upright portion of said member and clamp means removably fastening the bottom panel of said container to the forwardly extending support portion of said member; a two-wheeled carriage mounted below said container at a point to the rear of the center of gravity of the super-structure and including a cross axle located beneath the support portion of said member and having the ends thereof extending beyond the sides of the bottom panel of said container, a pair of laterally spaced-apart wheels each rotatably mounted on one of the ends of said axle with the bottom panel of said container located therebetween, and a bolster plate supported upon said axle between said wheels and located between the bottom panel of said container and the support portion of said member; and additional clamps removably fastening said bolster plate to the bottom panel of said container.

2. A wheeled mobile container apparatus comprising, in combination; a single, substantially rigid, elongated, rod-like member bent to provide a forwardly extending support portion, a forward terminal supporting portion in front of the support portion extending downwardly with respect to the latter and terminating at a lower end, a substantially upright portion extending upwardly from the rear of the support portion, and a handle portion extending from the upper part of the substantially upright portion; an open-top, non-collapsible container having a back portion and a bottom portion and medially supported on said member to constitute therewith a super-structure; means fastening the back portion of said container to the substantially upright portion of said member and means fastening the bottom portion of said container to the forwardly extending support portion of said member; a two-wheeled carriage mounted below said container at a point to the rear of the center of gravity of the super-structure and including a cross axle located beneath the bottom portion of said container and having the ends thereof extending beyond the sides of the bottom portion of said container, a pair of laterally spaced-apart wheels each rotatably mounted on one of the ends of said axle with the bottom portion of said container located therebetween, and bolster means supported upon said axle between said wheels and located beneath the bottom portion of said container; and additional means fastening said bolster means to the bottom portion of said container.

GEORGE MARTIN.

REFERENCES CITED

The following references are of record in the file of this patent:

UNITED STATES PATENTS

| Number | Name | Date |
| --- | --- | --- |
| 2,405,674 | Schliwa et al. | Aug. 13, 1946 |
| 2,415,334 | Brown | Feb. 4, 1947 |
| 1,393,876 | Wright | Oct. 18, 1921 |
| 1,751,902 | Brown | Mar. 25, 1930 |
| 2,335,579 | Chamberlin et al. | Nov. 30, 1932 |